US008924545B2

(12) United States Patent
Orr et al.

(10) Patent No.: US 8,924,545 B2
(45) Date of Patent: Dec. 30, 2014

(54) CROSS-PROPERTY IDENTITY MANAGEMENT

(75) Inventors: Richard Harvey James Orr, Redmond, WA (US); Kimberly Maughan Saunders, Kirkland, WA (US); Guillermo Proano, Sammamish, WA (US); Edward James Lehman, Sammamish, WA (US); Maria Balsamo, Bellevue, WA (US); Dirk Myers, Kirkland, WA (US); Peter Gilmore Dodd, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 13/350,513

(22) Filed: Jan. 13, 2012

(65) Prior Publication Data
US 2013/0185412 A1 Jul. 18, 2013

(51) Int. Cl.
G06F 17/30 (2006.01)
H04L 29/12 (2006.01)
H04L 12/14 (2006.01)
H04M 15/00 (2006.01)

(52) U.S. Cl.
CPC .......... *G06F 17/30* (2013.01); *H04L 29/12594* (2013.01); *H04L 12/1457* (2013.01); *H04M 2215/724* (2013.01); *H04M 15/765* (2013.01)
USPC ........... 709/224; 707/766; 707/784; 707/736; 707/E17.014

(58) Field of Classification Search
USPC ....................................................... 709/224
See application file for complete search history.

(56) References Cited

U.S. PATENT DOCUMENTS

| 6,487,584 | B1 | 11/2002 | Bunney |
| 6,647,383 | B1 * | 11/2003 | August et al. .................... 1/1 |
| 7,237,256 | B2 * | 6/2007 | Cheng et al. .................. 726/3 |
| 7,703,023 | B2 | 4/2010 | O'Mahony et al. |
| 7,756,890 | B2 * | 7/2010 | Carter ........................ 707/776 |
| 7,797,274 | B2 | 9/2010 | Strathearn et al. |
| 8,131,745 | B1 * | 3/2012 | Hoffman et al. ............. 707/766 |
| 8,341,225 | B2 * | 12/2012 | Parsons et al. .............. 709/205 |

(Continued)

FOREIGN PATENT DOCUMENTS

KR 10-0806430 2/2008

OTHER PUBLICATIONS

Naaman et al., "Is it Really About Me ? Message Content in Social Awareness Streams", 2010.*

(Continued)

*Primary Examiner* — O. C. Vostal
(74) *Attorney, Agent, or Firm* — Nicholas Chen; Doug Barker; Micky Minhas

(57) ABSTRACT

Embodiments are directed to creating a persona from observed characteristics of content and to sharing a network persona derived from observed characteristics of content. In one scenario, a computer system observes one set of properties for a first portion of content on a network. The first portion of content is from a first account. The computer system also observes a different set of properties for a second portion of content on the network, where the second portion of content is from a second account. The computer system then correlates an association between the first account and the second account as part of a network persona that is based on the first properties and one or more corresponding properties from the second portion of content.

18 Claims, 4 Drawing Sheets

(56) References Cited

U.S. PATENT DOCUMENTS

| | | | |
|---|---|---|---|
| 8,374,930 B2* | 2/2013 | Benisti et al. | 705/34 |
| 8,589,437 B1* | 11/2013 | Khomenko et al. | 707/783 |
| 8,738,611 B1* | 5/2014 | Zarmer et al. | 707/723 |
| 8,738,634 B1* | 5/2014 | Roth et al. | 707/748 |
| 2001/0056463 A1* | 12/2001 | Grady et al. | 709/203 |
| 2004/0230676 A1* | 11/2004 | Spivack et al. | 709/223 |
| 2005/0195854 A1* | 9/2005 | Agmon et al. | 370/465 |
| 2006/0095337 A1* | 5/2006 | Morgan | 705/26 |
| 2007/0239522 A1* | 10/2007 | Kunz et al. | 705/14 |
| 2008/0082421 A1 | 4/2008 | Onyon et al. | |
| 2008/0220530 A1* | 9/2008 | Bahn et al. | 436/63 |
| 2008/0262848 A1* | 10/2008 | Shienbrood et al. | 704/275 |
| 2008/0288324 A1* | 11/2008 | Graczynski et al. | 705/10 |
| 2009/0011743 A1* | 1/2009 | Johanson et al. | 455/414.1 |
| 2009/0125518 A1 | 5/2009 | Bailor et al. | |
| 2009/0125521 A1* | 5/2009 | Petty | 707/9 |
| 2009/0138922 A1* | 5/2009 | Thomas et al. | 725/87 |
| 2009/0157491 A1* | 6/2009 | Brougher et al. | 705/11 |
| 2009/0165103 A1 | 6/2009 | Cho et al. | |
| 2009/0165128 A1 | 6/2009 | McNally et al. | |
| 2009/0319368 A1* | 12/2009 | Reardon et al. | 705/14.51 |
| 2010/0063880 A1* | 3/2010 | Atsmon et al. | 705/14.53 |
| 2010/0131640 A1 | 5/2010 | Carter | |
| 2010/0161499 A1 | 6/2010 | Holcombe et al. | |
| 2010/0161600 A1* | 6/2010 | Higgins et al. | 707/736 |
| 2010/0169314 A1* | 7/2010 | Green et al. | 707/736 |
| 2010/0228767 A1* | 9/2010 | Slinker et al. | 707/769 |
| 2010/0274815 A1* | 10/2010 | Vanasco | 707/798 |
| 2010/0313250 A1* | 12/2010 | Chow | 726/5 |
| 2010/0318623 A1* | 12/2010 | Bloch et al. | 709/206 |
| 2011/0141106 A1* | 6/2011 | Runge et al. | 345/419 |
| 2011/0191247 A1* | 8/2011 | Dominguez et al. | 705/64 |
| 2011/0201414 A1* | 8/2011 | Barclay et al. | 463/25 |
| 2011/0213726 A1* | 9/2011 | Schalk et al. | 705/321 |
| 2011/0225048 A1* | 9/2011 | Nair | 705/14.66 |
| 2011/0246484 A1* | 10/2011 | Dumais et al. | 707/749 |
| 2011/0269548 A1* | 11/2011 | Barclay et al. | 463/42 |
| 2011/0289010 A1* | 11/2011 | Rankin et al. | 705/313 |
| 2011/0295899 A1* | 12/2011 | James et al. | 707/784 |
| 2011/0302144 A1* | 12/2011 | Hamilton et al. | 707/705 |
| 2012/0005209 A1* | 1/2012 | Rinearson et al. | 707/737 |
| 2012/0035996 A1* | 2/2012 | McLean | 705/14.16 |
| 2012/0159479 A1* | 6/2012 | Chardon et al. | 718/1 |
| 2012/0167234 A1* | 6/2012 | Donfried et al. | 726/29 |
| 2012/0191776 A1* | 7/2012 | Ruffner et al. | 709/204 |
| 2012/0209795 A1* | 8/2012 | Glickman | 706/12 |
| 2012/0254225 A1* | 10/2012 | Carter et al. | 707/769 |
| 2013/0039531 A1* | 2/2013 | Basso et al. | 382/103 |
| 2013/0054701 A1* | 2/2013 | Leeder et al. | 709/205 |
| 2013/0095914 A1* | 4/2013 | Allen et al. | 463/25 |
| 2013/0205371 A1* | 8/2013 | Laurier et al. | 726/4 |

OTHER PUBLICATIONS

Ramakrishnan, et al., "Toward a PeopleWeb", In Journal Computer, vol. 40, Issue 8, Aug. 2007, pp. 63-72.

Halim, et al., "Wiki Credibility Enhancement", In Proceedings of the 5th International Symposium on Wikis and Open Collaboration, Oct. 25-27, 2009, pp. 1-4.

International Search Report dated Jun. 13, 2013 cited in PCT No. PCT/US2013/021088, acting as English Translation of Foreign Reference KR 10-0806430.

* cited by examiner

CROSS-PROPERTY IDENTITY MANAGEMENT

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to interact with other software applications or other computer systems. For instance, internet browsers allow interaction with other computer systems connected to the internet. Other applications, such as social media applications, also allow interaction with other users, websites and computer systems. These social media programs may allow users to create profiles describing them as an individual. As such, users may have different profiles, including public, private and professional profiles. In conjunction with these profiles, users may author articles, blog posts, comments, chat conversations, text messages or other written or pictorial items. In some cases, it may not be clear if or whether certain profiles are related, or who has authored a given informational item.

BRIEF SUMMARY

Embodiments described herein are directed to creating a persona from observed characteristics of content and to sharing a network persona derived from observed characteristics of content. In one embodiment, a computer system observes one set of properties for a first portion of content on a network. The first portion of content is from a first account. The computer system also observes a different set of properties for a second portion of content on the network, where the second portion of content is from a second account. The computer system then correlates an association between the first account and the second account as part of a network persona that is based on the first properties and one or more corresponding properties from the second portion of content.

In another embodiment, a computer system observes one set of properties for a first portion of content on a network. The first portion of content is from a first account. The computer system also observes a different set of properties for a second portion of content on the network, where the second portion of content is from a second account. The computer system then correlates an association between the first account and the second account as part of a network persona that is based on the first properties and one or more corresponding properties from the second portion of content. The computer system then receives an indication from a user that the user's network persona is to be shared with certain specified users. The network persona to be shared includes information about accounts under the user's direct control including third party accounts. In response to this indication, the user's network persona is shared with the specified users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
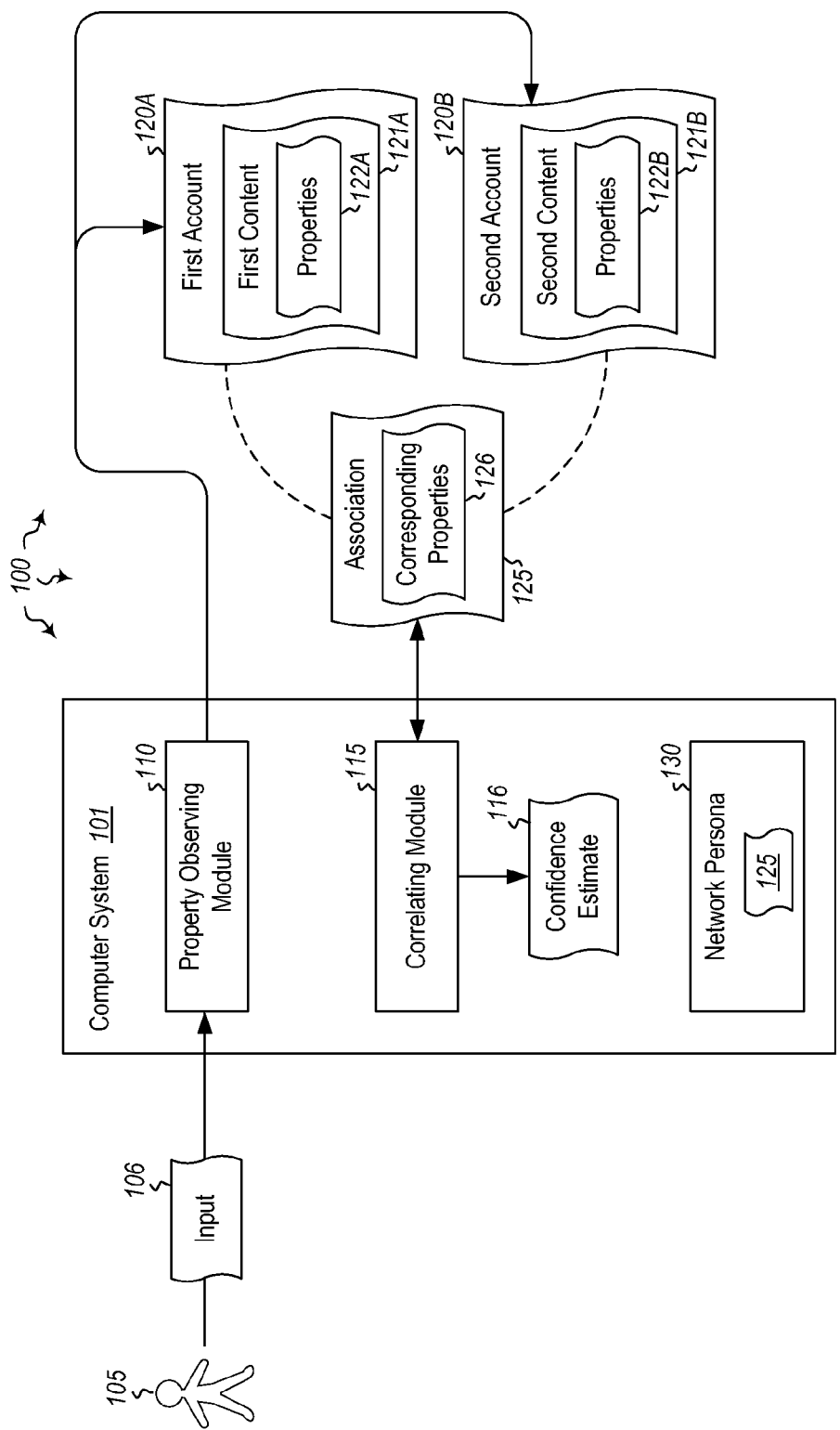
FIG. 1 illustrates a computer architecture in which embodiments of the present invention may operate including creating a persona from observed characteristics of content.

Embodiments described herein are directed to creating a persona from observed characteristics of content and to sharing a network persona derived from observed characteristics of content. In one embodiment, a computer system observes one set of properties for a first portion of content on a network. The first portion of content is from a first account. The computer system also observes a different set of properties for a second portion of content on the network, where the second portion of content is from a second account. The computer system then correlates an association between the first account and the second account as part of a network persona that is based on the first properties and one or more corresponding properties from the second portion of content.

In another embodiment, a computer system observes one set of properties for a first portion of content on a network. The first portion of content is from a first account. The computer system also observes a different set of properties for a second portion of content on the network, where the second portion of content is from a second account. The computer system then correlates an association between the first account and the second account as part of a network persona that is based on the first properties and one or more corresponding properties from the second portion of content. The computer system then receives an indication from a user that the user's network persona is to be shared with certain specified users. The network persona to be shared includes information about accounts under the user's direct control including third party accounts. In response to this indication, the user's network persona is shared with the specified users.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system, including a cloud computing system. The computer system includes various different modules for performing a variety of different functions. For instance, property observing module 110 may observe properties 122A that are associated with content 121A, that itself is associated with a user account 120A. Other modules may find associations 125 between properties and correlate the data (115) to create network personas 130. These functions will be explained further below. It should be noted, however, that while certain modules and elements are shown as being part of computer system 101, any of the modules, accounts, associations or other elements may be part of computer system 101 or part of another local or distributed computer system.

In some cases, web communities may include many different users, some of whom are easily identifiable, and some of whom are anonymous. Moreover, users may use different names or aliases on different accounts (such as personal accounts, private accounts, professional accounts, etc.). Identifying relevant authorship may be accomplished by grouping property-specific accounts together into a persona (e.g. 130). A "persona" or "network persona", as the terms are used herein, may refer to an abstract representation of related resources for content attributed to a certain author. Personas may be created declaratively by a person, deduced from metadata in related profiles or accounts, inferred from characteristics of the resource, or determined by any combination of these factors. As such, personas may be used as a form of identity management. This form of identity management may be based on data observed in various internet resources and does not rely on the source system's representation of identity.

Various embodiments described herein involve handling identity as a set of associations between observed characteristics of content. The identity-handling system provides a flexible concept of identity that can both represent actual people as well as teams, public/professional roles, and statistically useful collections of accounts.

Embodiments include multiple types of identity representation including many-to-many account-to-persona identity representation. A representation of an identity may be provided that allows for identity (or, in other words, identifying an author) across multiple properties, including multiple identities on the same property (such as personal and corporate microblogging accounts), and multiple personas for an identity (group blogs, group microblogging accounts). This allows consumers and processing systems to flexibly represent authorship and accounts for the complexity of collaborative work and team publication, even in cases where the publishing system itself does not represent this complexity.

Embodiments described herein also include multiple confidence levels of identity correlation. Systems herein may use multiple mechanisms for identifying authorship of a resource and determining common authorship. The systems may also provide multiple levels of correlation for identities. These correlation levels include one or more of the following: 1) Declared correlation occurs when an author with control over more than one account explicitly declares correlation between accounts, such as when profile information for one account refers to another account and vice-versa. 2) Implied correlation occurs when an author with control over more than one account indicates correlation between accounts implicitly, such as referring to an account as "my account". 3) Inferred correlation occurs when the system can infer common ownership based on various combinations of name, topics, textual structures, time of posting, references between accounts, and so on.

4) Validated correlation occurs when an administrator or operator of the system creates or confirms an association between properties. 5) Self-validated correlation occurs when a user of the system confirms associations for their own accounts. It should be noted that this is a stronger correlation than a declared correlation, as the user of the system has explicitly ratified the correlation. 6) Blocked correlation is a representation of a correlation that functions as a placeholder to keep any other form of correlation from being established. This allows administrators or users to explicitly represent situations where a correlation is incorrectly inferred or declared, or where an author wants to explicitly keep accounts separate.

Each of these types of correlation has a different base confidence level. Within each representation, the systems described herein can track a confidence level based on the confidence within that type of correlation. With the exception of the blocked correlation, a handle and account may be correlated in more than one way based on independent data. In such cases, the system weighs the overall degree of correlation more heavily than accounts that have only a single method of correlation.

Embodiments described herein allow for different personas including private, shared, and/or public personas. Systems herein allow users of the system to publish or share persona definitions that involve both statements about accounts under their direct control and about third party accounts. Personas may be shared with specific users, groups of users, or any user of the system. Users may also be able to create entirely private personas for their own usage. These personas may be organized using data outside of the system or may be artificially constructed based on account or post characteristics (e.g., an artificial persona constructed of a random sampling of accounts that share similar posting characteristics may be useful for analysis purposes). Administrators of the system can share "official" or "validated" personas.

Embodiments also allow for partial account representation. Systems described herein may anticipate more complex representations of identity to allow more granular partitioning. For example, an account can be associated with two distinct sets of topics. One set of topics may be associated with a published professional or group persona, while the other set of topics may be associated with a private persona. Embodiments may also allow the use of a stable identifier for cross system integration. Systems may provide a stable identifier for each account (or partial account) and persona. The stable identifier allows interoperation with other systems that track resource publication, origin, and correlation, and allows users of those systems to choose to publish their account information into the systems described herein. The stable identifier also allows users to publish account information outside of the systems herein. Trusted external systems may also be configured to provide an account and retrieve the corresponding stable identifier (or identifiers) for that account and associated personas.

Still further, embodiments allow for granular management of identity correlation. Systems herein provide the ability for the owner of an account to explicitly manage correlations for that account. The systems may explicitly represent correlations that should not be inferred, or accounts that should not be combined with other accounts in personas. This allows account owners to manage their identity This includes partial account representation. That is, the owner of an account may allow content on certain topics to be associated with a persona, while not allowing any other content from the account to be associated with that persona. The systems may also annotate personas to assist in targeted analysis or resource retrieval. For example, a persona that seems to be automatically reposting other content can be marked as an automated poster. Likewise, personas that originate traffic that is picked up by a wide variety of other sources can be marked as influencers. Many other annotations are possible, and may be configured by a user. A common set of attributes commonly used to track influencers may also be provided. Still further, the ability for applications to add custom attributes may also be provided. As with other characteristics of the system, the system may track a confidence factor for annotations.

In one embodiment, the following steps may be performed (although not necessarily in the order provided). 1) Collection of account, profile, and topic information across multiple properties, 2) Correlation of account into personas, 2A) Automated correlation where relationships have not been observed before, 2B) Refinement of a confidence estimate where relationships have been previously observed, 2C) Recordation of suggested correlations where confidence falls below a specific threshold, 3) Manual correlation and confirmation of correlations, 4) Topic and place specification to allow partial account definition, 5) Correlation into artificial accounts based on profile information or existing knowledge (MVP accounts, partner accounts, early adopter program accounts, and so on), 6) Representation of personas for data analysis and retrieval in the system, 7) Providing of service interfaces for trusted applications to retrieve identifiers and associations or submit observations, propose associations and propose annotations to the system, and 8) Scheduled processing of aggregated traffic and influencer characteristics to produce and refine automated annotations.

Thus, as described above, systems described herein may provide a very flexible and precise way of managing internet identity. The topic- and place-based specifications allow very granular correlation. This gives the system the ability to represent privacy and relevance in the way that may better match offline expectations of personal disclosure and privacy, as well as allow proper focus on relevant information presented by a single person. These concepts will be explained further below with regard to methods 200 and 300 of FIGS. 2 and 3, respectively.

Figure 2:
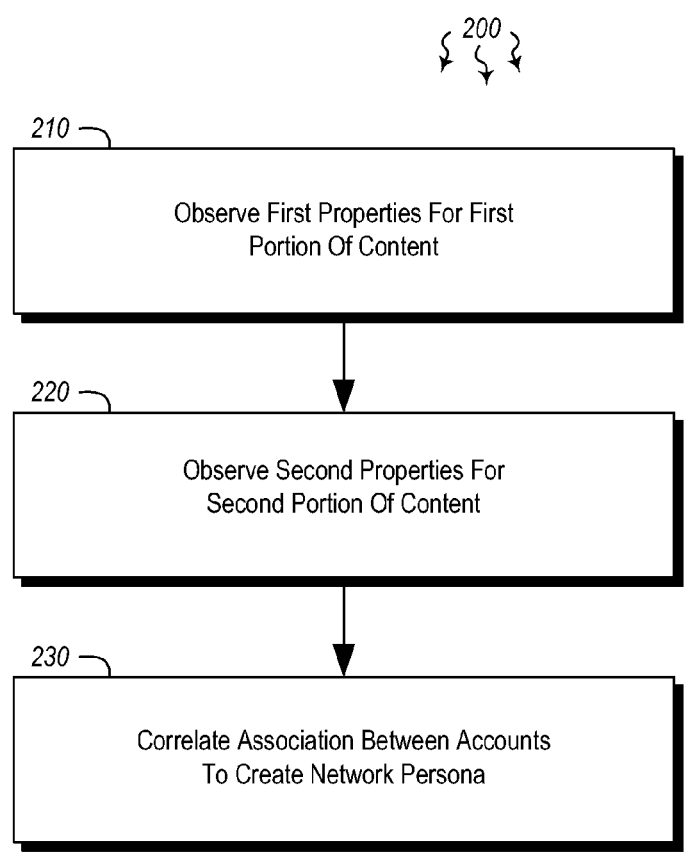
FIG. 2 illustrates a flowchart of an example method for creating a persona from observed characteristics of content.
Figure 3:
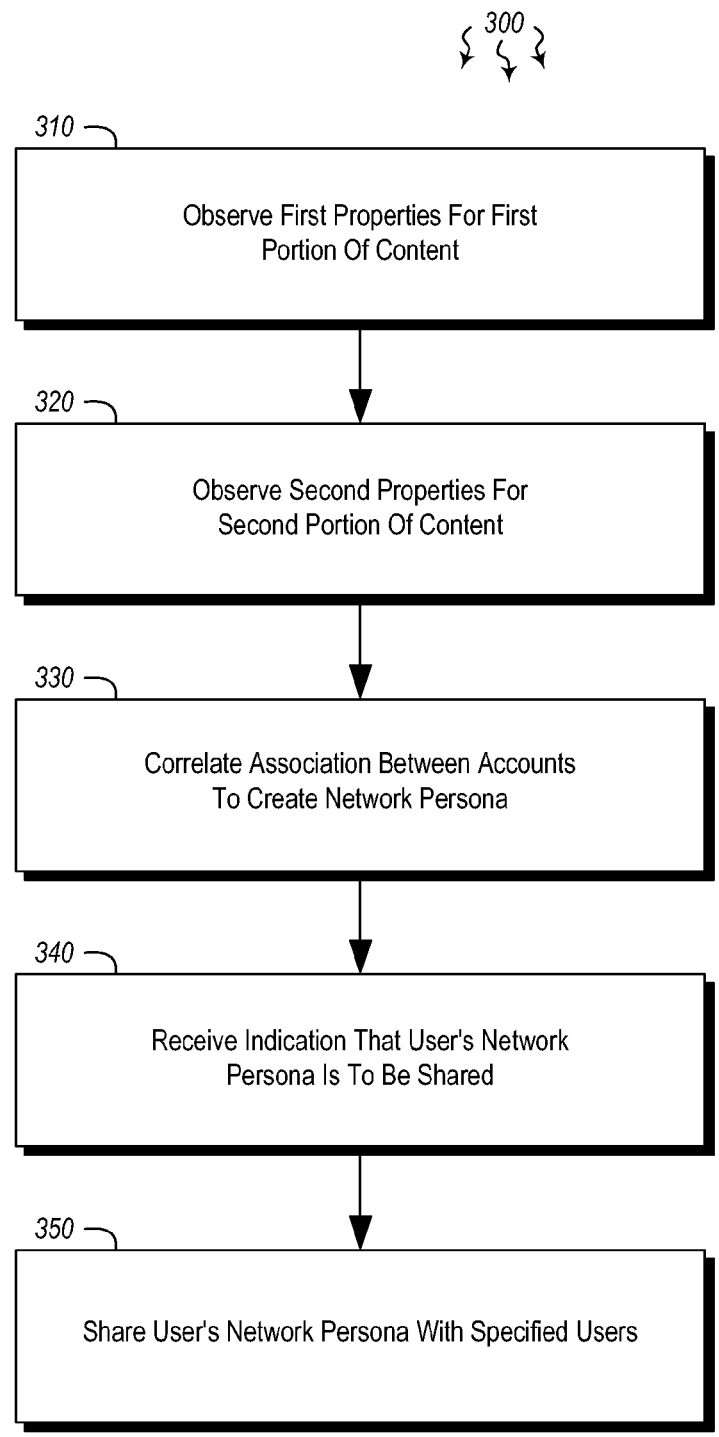
FIG. 3 illustrates a flowchart of an example method for sharing a network persona derived from observed characteristics of content.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for creating a persona from observed characteristics of content. The method 200 will now be described with frequent reference to the components and data of environment 100.

Method 200 includes an act of observing a first one or more properties for a first portion of content on the network, the first portion of content from a first account (act 210). For example, property observing module 110 may observe a first properties 122A that are part of first content 121A, where the first content is part of first account 120A. The first properties (and any properties discussed herein) may include account, profile, and/or topic information for the related portion of content. Thus, properties 122A may include account information, profile information and/or topic information for the first content 121A. The first account may be associated with, for example, a first set of topics and a second set of topics, where the first set of topics is associated with a published professional persona and the second set of topics is associated with a private persona. Thus, one author may be associated with multiple sets of topics, where each set is associated with a professional or private persona for the author.

Method 200 also includes an act of observing a second one or more properties for a second portion of content on the network, the second portion of content from a second account (act 220). Thus, property observing module 110 may observe properties 122B which are associated with second content 121B, which is in turn associated with second account 120B. Correlating module 115 may then be used to correlate an association 125 between the first account 120A and the second account 120B as part of a network persona 130 that is based on at least some of the first properties 122A corresponding to some of second properties (act 230). Accordingly, when a property of the first account corresponds to a property of the second account, the two can be said to be associated, and association 125 is created. The association (which includes the corresponding properties 126) then becomes part of an author's network persona. The association links the first account to the second account. Thus, for example, an author's professional account may be linked to a public or a private account. As such, user accounts may be correlated to track authorship or identity over various portions of content produced as part of an account or user profile.

In some embodiments, the computer system 101 may compare first properties 122A to a corresponding second properties 122B prior to correlating the association 125 between the first account 120A and the second account 120B. The comparing may include comparing properties such as name, topic, textual structures, time of posting, and references between accounts. The comparison looks for properties that are included in both the first portion of content 121A and in the second portion of content 121B. Correlating an association 125 between the first account and the second account as part of generating the network persona 130 may include inferring a correlation between the first account and the second account based on the comparison between the first set of properties and the corresponding second set of properties. Such an inferred correlation may occur when the correlating module 115 can infer common ownership based on various combinations of name, topics, textual structures, time of posting, references between accounts, and other factors.

Additionally or alternatively, correlating an association 125 between the first account 120A and the second account 120B as part of generating the network persona 130 may include identifying an implied correlation between the first account and the second account based on the first portion of content referencing the second account. As mentioned above, an implied correlation may occur when an author with control over more than one account indicates correlation between accounts implicitly, such as referring to an account as "my account". Still further, correlating an association as part of a network persona may include receiving an indication from an author with control over the first and second accounts (e.g. an author's public and private accounts) that the first account and the second account are correlated. This direct, declared correlation may include a high confidence factor 116, as the author has explicitly stated that both accounts belong to him or her. Different confidence factors may be attached to or associated with different ways of determining common authorship. Each adds a different weight to the confidence estimate. This confidence estimate may be refined as new properties are observed and new associations are correlated.

In some embodiments, a stable identifier may be assigned to the network persona 130 to facilitate interoperation with other systems that track resource publication, origin, and correlation. The assigned stable identifier also allows users of those systems to choose to publish their account information into the identity management systems described herein. It also allows users of systems described herein to publish account information outside these systems. It should also be noted that when associations are correlated between accounts, the resulting network persona 130 may include a single identity across multiple properties, multiple identities on the same property, and/or multiple personas for a specified identity.

Figure 4:
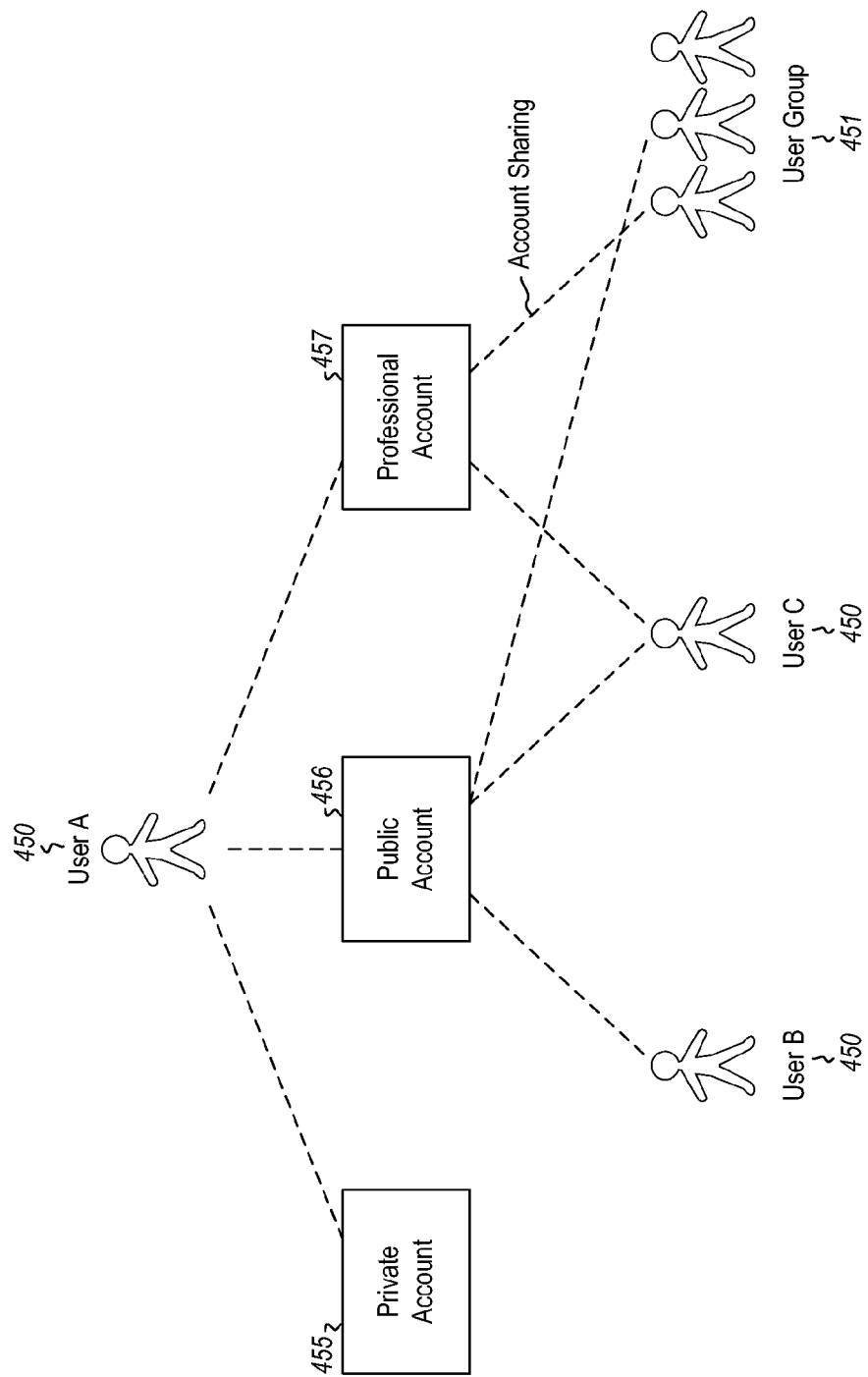
FIG. 4 illustrates an embodiment in which a network persona is shared with other users or groups of users.

FIG. 3 illustrates a flowchart of a method 300 for sharing a network persona derived from observed characteristics of content. The method 300 will now be described with frequent reference to the components and data of environments 100 and 400 of FIGS. 1 and 4, respectively.

Method 300 includes an act of observing a first one or more properties for a first portion of content on the network, the first portion of content from a first account (act 310). For example, as explained above, property observing module 110 may observe first properties 122A of first content 121A of first account 120A. The observing module also observes second properties 122B of second content 121B of second account 120B (act 320). These properties (e.g. account, profile, and/or topic information for the related portion of content) may be observed for any type of content, in relation to substantially any type of account or user profile. Correlating module 115 may correlate an association 125 between the first account and the second account as part of a network persona 130 based corresponding properties (126) between properties 122A and 122B (act 330).

In some cases, the network persona associated with a given author or user may be annotated to identify the persona as a specified type of persona. For example, if the user is (or seems to be) very influential about a given topic, or on a given forum or on a specified communication medium (e.g. microblogging), that persona may be labeled as an influencer. If an account is automatically reposting other people's messages, the persona related to that account may be labeled as an automatic re-poster. Many such specified types or labels may be used. These persona types may be customized by a user (e.g. user 105 via input 106) or an administrator. These specified, annotated types of personas may be tracked to continually refine confidence factors associated with the personas. For example, an influencer may have his confidence factors increased, while an automatic re-poster may have his confidence factors decreased.

Method 300 next includes an act of receiving an indication from a user that the user's network persona is to be shared with one or more specified users, wherein the network persona to be shared comprises information about accounts under the user's direct control including one or more third party accounts (act 340). Thus, user 450A may indicate to computer system 101 that his or her network persona is to be shared. The network persona may include multiple different accounts, including a private account 455, a public account 456 and a professional account 457. Each of these accounts may be shared with specified users (act 350), according to the user's specifications. Thus, if the user specifies that the private account is only for private usage, it is not shared with any other users. The user may specify that his or her public account is to be shared with all other users including user 450B, user 450C and user group 451. The user may also specify that his or her professional account is to be shared with user 450C and with user group 451. For instance, user 450C may be a professional associate at another corporation, while user group 451 may include the user's peers. Many such sharing combinations are possible, and the reader will understand that those examples illustrated are for demonstration purposes only.

Account owners may be allowed to at least partially manage correlations for each account under their control. As such, the owner may specify any one or more of the following: correlations that may be inferred, correlations that are not to be inferred, accounts that are not to be combined with other accounts and other options. Accordingly, a user that is signed up with the identity management system described herein may have some control over associations that may be made and published by the system. This control may allow the user to specify, for each account, who is allowed to see the associations between the user's accounts. Accordingly, accounts may be shared across users and user groups alike.

Thus, methods, systems and computer program products are provided which create personas from observed characteristics of content. Moreover, methods, systems and computer program products are provided which share network personas derived from observed characteristics of content.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including one or more processors and system memory, the computer system connected to a network with one or more other computer systems, a method for creating a persona from observed characteristics of content, the method comprising:

an act of observing a first one or more properties for a first portion of content on the network, the first portion of content from a first account;

an act of observing a second one or more properties for a second portion of content on the network, the second portion of content from a second account;

comparing the first properties and the second properties to discover similarities between the first properties and second properties; and an act of correlating an association between the first account and the second account as part of a network persona based on at least one of the first one or more properties and a corresponding at least one of the second one or more properties, wherein the act of correlating an association between the first account and the second account comprises identifying an implied correlation between the first account and the second account based on the first portion of content referencing the second account and wherein each type of correlation determined between the first account and the second account as part of a network persona adds a specified amount of confidence weight to a confidence estimate.

2. The method as recited in claim 1, wherein the act of observing a first one or more properties for a first portion of content on the network comprises an act of observing one or more of: account, profile, and topic information for the first portion of content.

3. The method as recited in claim 1, further comprising an act of comparing at least one of the first one or more properties to a corresponding at least one of the second one or more properties prior to correlating the association between the first account and the second account.

4. The method as recited in claim 3, wherein the act of comparing at least one of the first one or more properties to a corresponding at least one of the second one or more properties comprises comparing one or more properties selected from among: name, topics, textual structures, time of posting, and references between accounts, the selected one or more properties included in the first portion of content and in the second portion of content.

5. The method as recited in claim 1, wherein the act of correlating an association between the first account and the second account as part of a network persona comprises inferring a correlation between the first account and the second account based on the comparison between the at least one of the first one or more properties and the corresponding at least one of the second one or more properties.

6. The method as recited in claim 1, wherein the act of correlating an association between the first account and the second account as part of a network persona comprises an act of receiving an indication that the first account and the second account are correlated, the indication being received from an author with control over the first account and the second account.

7. The method as recited in claim 1, wherein the act of correlating an association between the first account and the second account as part of a network persona comprises an act of refining the confidence estimate for an existing association between the first account and the second account as part of the network persona.

8. The method as recited in claim 1, further comprising assigning a stable identifier to the network persona to facilitate interoperation with other systems.

9. The method as recited in claim 1, wherein the network persona identifies one or more of the following: an identified individual, a team of individuals, a public or professional role and a collection of accounts.

10. The method as recited in claim 1, wherein the act of correlating an association between the first account and the second account as part of a network persona results in at least one of the following: a network persona comprising a single identity across multiple properties, a network persona comprising multiple identities on the same property, and multiple personas for a specified identity.

11. The method as recited in claim 1, wherein the first account is associated with at least a first set of topics and a second set of topics, wherein the first set of topics is associated with a published professional persona and wherein the second set of topics is associated with a private persona.

12. At a computer system including one or more processors and system memory, the computer system connected to a network with one or more other computer systems, a method for sharing a network persona derived from observed characteristics of content, the method comprising:

an act of observing a first one or more properties for a first portion of content on the network, the first portion of content from a first account;

an act of observing a second one or more properties for a second portion of content on the network, the second portion of content from a second account;

comparing the first properties and the second properties to discover similarities between the first properties and second properties;

an act of correlating an association between the first account and the second account as part of a network persona based on at least one of the first one or more properties and a corresponding at least one of the second one or more properties, wherein the act of correlating an association between the first account and the second account comprises identifying an implied correlation between the first account and the second account based on the first portion of content referencing the second account and wherein each type of correlation determined between the first account and the second account as part of a network persona adds a specified amount of confidence weight to a confidence estimate;

an act of receiving an indication from a user that the user's network persona is to be shared with one or more specified users, wherein the network persona to be shared comprises information about accounts under the user's control including one or more third party accounts; and an act of sharing the user's network persona with the specified users.

13. The method as recited in claim 12, further comprising allowing the user to create a private persona for personal usage.

14. The method as recited in claim 12, further comprising allowing the owner of the first account to at least partially manage correlations for the first account, such that the owner specifies at least one of the following: correlations that are not to be inferred and accounts that are not to be combined with other accounts in personas.

15. The method as recited in 12, wherein one or more of the personas is annotated to identify the persona as a specified type of persona.

16. The method as recited in claim 15, wherein one or more specified, annotated types of personas is tracked to continually refine confidence factors associated with the personas.

17. A computer system comprising the following:

one or more processors;

system memory;

one or more computer-readable storage media having stored thereon computer-executable instructions that, when executed by the one or more processors, causes the computing system to perform a method for creating a persona from observed characteristics of content, the method comprising the following:

an act of observing a first one or more properties for a first portion of content on the network, the first portion of content from a first account;

an act of observing a second one or more properties for a second portion of content on the network, the second portion of content from a second account;

comparing the first properties and the second properties to discover similarities between the first properties and second properties;

an act of correlating an association between the first account and the second account as part of a network persona based on at least one of the first one or more properties and a corresponding at least one of the second one or more properties, wherein the act of correlating an association between the first account and the second account comprises identifying an implied correlation between the first account and the second account based on the first portion of content referencing the second account; and an act of refining a confidence estimate for an existing association between the first account and the second account as part of the network persona, wherein each type of correlation determined between the first account and the second account as part of a network persona adds a specified amount of confidence weight to the confidence estimate.

18. The computer system as recited in claim 17, wherein the act of correlating an association between the first account and the second account as part of a network persona results in at least one of the following: a network persona comprising a single identity across multiple properties, a network persona comprising multiple identities on the same property, and multiple personas for a specified identity.

* * * * *